(12) United States Patent
Frenzel

(10) Patent No.: US 11,001,132 B2
(45) Date of Patent: May 11, 2021

(54) MOTOR VEHICLE

(71) Applicant: Bayerische Motoren Werke Aktiengesellschaft, Munich (DE)

(72) Inventor: Moritz Frenzel, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 145 days.

(21) Appl. No.: 16/249,949

(22) Filed: Jan. 17, 2019

(65) Prior Publication Data

US 2019/0144048 A1 May 16, 2019

Related U.S. Application Data

(63) Continuation of application No. PCT/EP2017/067733, filed on Jul. 13, 2017.

(30) Foreign Application Priority Data

Jul. 20, 2016 (DE) .................. 10 2016 213 262.8

(51) Int. Cl.
*B60K 1/04* (2019.01)
*H01M 50/20* (2021.01)
(Continued)

(52) U.S. Cl.
CPC .............. *B60K 1/04* (2013.01); *B60R 16/033* (2013.01); *B62D 25/20* (2013.01); *B62D 27/04* (2013.01);
(Continued)

(58) Field of Classification Search
CPC ...... B62D 27/04; B62D 25/20; B62D 29/041; B60R 16/033; B60K 1/04; B60K 2001/0438; H01M 2/1083; H01M 2220/20
(Continued)

(56) References Cited

U.S. PATENT DOCUMENTS 4,559,252 A * 12/1985 Motoda .................. B32B 15/08
428/57
5,378,555 A 1/1995 Waters et al.
(Continued)

FOREIGN PATENT DOCUMENTS

CN 102074750 A 5/2011
CN 203651910 U 6/2014
(Continued)

OTHER PUBLICATIONS

International Search Report (PCT/ISA/210) issued in PCT Application No. PCT/EP2017/067733 dated Sep. 25, 2017 with English translation (seven pages).
(Continued)

*Primary Examiner* — Pinel E Romain
(74) *Attorney, Agent, or Firm* — Crowell & Moring LLP

(57) ABSTRACT

A motor vehicle has a housing for energy storage devices arranged on a lower face of a floor assembly of the motor vehicle such that vibrations of the floor assembly are reduced. At least one damping component is arranged in an intermediate space between the lower face of the floor and an exterior of the cover of the housing structure. The damping component is installed into the intermediate space between the cover of the housing structure and the floor under pre-tension, and the damping component is a compressible foam.

12 Claims, 3 Drawing Sheets

(51) Int. Cl.
    *B60R 16/033* (2006.01)
    *B62D 25/20* (2006.01)
    *B62D 27/04* (2006.01)
    *B62D 29/04* (2006.01)
(52) U.S. Cl.
    CPC .......... *B62D 29/041* (2013.01); *H01M 50/20* (2021.01); *B60K 2001/0438* (2013.01); *H01M 2220/20* (2013.01)
(58) Field of Classification Search
    USPC ...................................................... 290/1.03
    See application file for complete search history.

(56) References Cited

U.S. PATENT DOCUMENTS

| | | | | |
|---|---|---|---|---|
| 5,578,393 | A * | 11/1996 | Haskins | H01M 2/1094 429/120 |
| 6,793,276 | B2 * | 9/2004 | Sugihara | B62D 21/10 296/1.03 |
| 7,014,256 | B2 * | 3/2006 | Kamura | B62D 25/20 296/1.03 |
| 7,243,984 | B2 * | 7/2007 | Sugihara | B60R 13/083 296/1.03 |
| 9,045,030 | B2 | 6/2015 | Rawlinson et al. | |
| 9,929,447 | B2 * | 3/2018 | Haussmann | H01M 2/1072 |
| 2005/0161967 | A1 * | 7/2005 | Rashidy | B62D 25/00 296/65.01 |
| 2008/0073923 | A1 * | 3/2008 | Miura | B62D 29/002 296/1.03 |
| 2008/0258483 | A1 * | 10/2008 | Weber | B62D 33/0612 296/1.03 |
| 2010/0025132 | A1 * | 2/2010 | Hill | B60L 3/0046 180/65.29 |
| 2012/0160583 | A1 | 6/2012 | Rawlinson | |
| 2013/0153317 | A1 | 6/2013 | Rawlinson et al. | |
| 2019/0337402 | A1 * | 11/2019 | Gunther | H01M 2/1077 |
| 2019/0381899 | A1 * | 12/2019 | Gunther | H01M 2/024 |
| 2020/0149229 | A1 * | 5/2020 | Matkin | E01C 19/2015 |
| 2020/0156486 | A1 * | 5/2020 | Howard | H01M 2/1077 |

FOREIGN PATENT DOCUMENTS

| | | |
|---|---|---|
| EP | 0 347 545 A1 | 12/1989 |
| EP | 2 610 943 A1 | 7/2013 |
| EP | 2 767 428 A1 | 8/2014 |

OTHER PUBLICATIONS

German-language Written Opinion (PCT/ISA/237) issued in PCT Application No. PCT/EP2017/067733 dated Sep. 25, 2017 (five pages).

German-language Search Report issued in counterpart German Application No. 10 2016 213 262.8 dated Jun. 16, 2017 with partial English translation (15 pages).

English translation of Chinese language Office Action issued in Chinese Application No. 201780042652.3 dated Dec. 16, 2020 (seven (7) pages).

* cited by examiner

MOTOR VEHICLE

CROSS REFERENCE TO RELATED APPLICATIONS

This application is a continuation of PCT International Application No. PCT/EP2017/067733, filed Jul. 13, 2017, which claims priority under 35 U.S.C. § 119 from German Patent Application No. 10 2016 213 262.8, filed Jul. 20, 2016, the entire disclosures of which are herein expressly incorporated by reference.

BACKGROUND AND SUMMARY OF THE INVENTION

The invention relates to a motor vehicle having a vehicle body with a passenger compartment. The passenger compartment has a floor structure. A housing structure for energy stores is fastened to an underside of the floor structure.

U.S. Pat. No. 9,045,030 B2 discloses a motor vehicle, in which a housing with a cover is arranged on an underside of a floor of a vehicle body. Energy stores, such as batteries, are arranged in the housing.

It is an object of the invention to provide a motor vehicle, in which a housing for energy stores is arranged on an underside of a floor assembly of the motor vehicle in such a way that the vibrations of the floor assembly are reduced.

A motor vehicle according to the invention has a vehicle body with a passenger compartment which comprises a floor structure. The housing structure for energy stores is fastened to an underside of the floor structure. The housing structure is a closed container which has a tub-shaped component and a cover which is spaced apart from the tub-shaped component. The tub-shaped component has, for example, circumferential side walls and a floor which is arranged on the side walls.

At least one damping component is advantageously arranged in an intermediate space between the underside of the floor and an outer face of the cover of the housing structure, which damping component is installed under prestress in the intermediate space between the cover of the housing structure and the floor. The damping component is a compressible foam.

In one advantageous embodiment, the compressible foam of the damping component is an elastomer foam.

The foam of the damping component is advantageously compressed to a predefined hardness by way of the fastening of the housing structure to the vehicle body floor. The foam height is dependent on various parameters. These parameters include the tolerance situation between the underside of the floor and the outer face of the cover of the housing structure. The existing tolerances are partially production-induced. Furthermore, tolerances for the assembly are necessary.

The foam height is additionally dependent on a vibration amplitude which occurs at the attachment location of the damping component below the floor during a journey of the motor vehicle and the associated excitation of the floor.

In one advantageous embodiment, the damping component is adhesively bonded on the outer face of the cover of the housing structure of the energy store and/or on the underside of the floor.

In one advantageous embodiment, the compressible foam has a rigidity which is adapted to the loading situation.

The damping component advantageously covers at least from 10 to 90% of the outer face on the underside of the floor.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
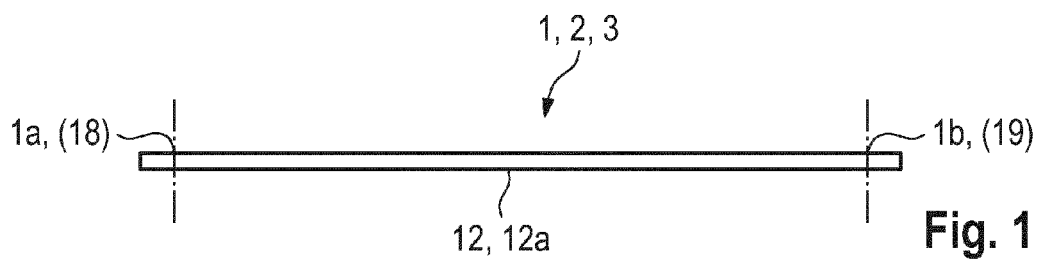
FIG. 1 is a basic illustration of a floor of a vehicle body, which floor is fastened at its two side edges to the side sills.

FIG. 1 shows a basic illustration of a floor 3 of a vehicle body 2 (not shown in further detail) of a motor vehicle 1. On its two side edges 1a and 1b, the floor 3 is clamped in fixedly in principle via side sills or longitudinal carriers 18, 19 (shown in FIG. 4) and side frames situated above them of a passenger compartment of the vehicle body 2.

Figure 2:
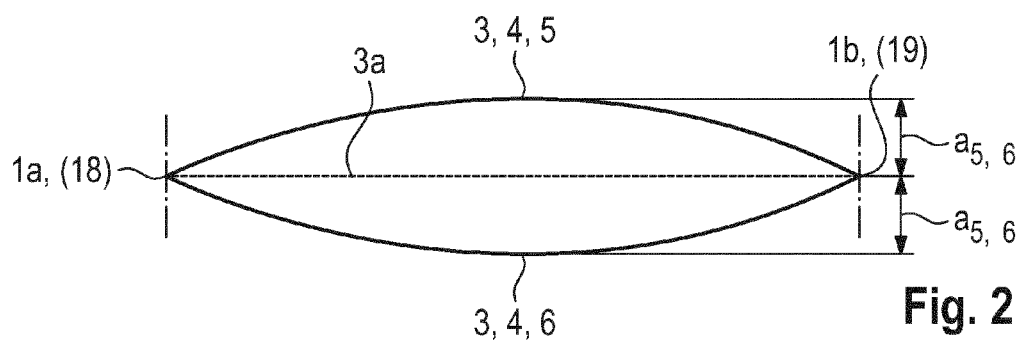
FIG. 2 shows a natural vibration mode which is produced in the case of a corresponding excitation of the floor of the vehicle body and moves upward in a bellied manner and downward in a bellied manner from a neutral center line between the two fastened side ends.

The floor 3 of the motor vehicle 1 is an oscillating system which has, for example, the natural vibration mode 4 which is shown in FIG. 2. The natural vibration mode 4 has an upwardly oscillating bellied or convex section 5 and a downwardly oscillating, bellied concave section 6. The convex section 5 and the concave section 6 in each case have the same maximum vibration amplitude $a_{5,6}$. FIG. 2 shows the neutral, non-vibrating state of the floor 3 using a dashed line 3a.

Figure 3:
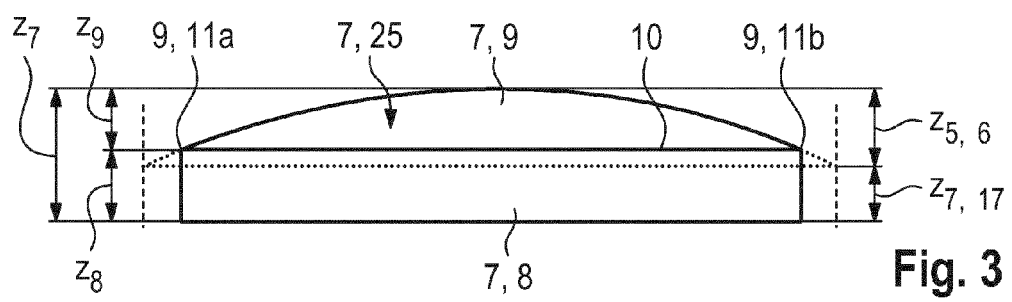
FIG. 3 is a cross-sectional view of a damping component in the neutral state, which damping component has an upwardly pointing concave shape in accordance with the upwardly pointing vibration mode in FIG. 2.

FIG. 3 shows a cross section of a damping component 7 made from an elastomer foam in a neutral, that is to say not prestressed, state 25. The damping component 7 is composed of a lower rectangular section 8 and an upper circular segment-shaped section 9. The damping component 7 has an overall height $z_7$. A continuous dividing line 10 marks the transition between the two sections 8 and 9.

The circular segment-shaped section 9 is supplemented at its two ends 11a and 11b with a dotted outline in FIG. 3. The circular segment-shaped section 9 which is enlarged by the dotted outline corresponds to the circular segment-shaped convex section 5 from FIG. 2 with a segment height $z_{5,6}$ in accordance with the maximum vibration amplitude $a_{5,6}$.

The circular segment-shaped section 9 has a segment height $z_9$ which is lower than the maximum vibration amplitude $a_{5,6}$ of the convex section 5 from FIG. 2. The rectangular section 8 has a height $z_8$.

Figure 4:
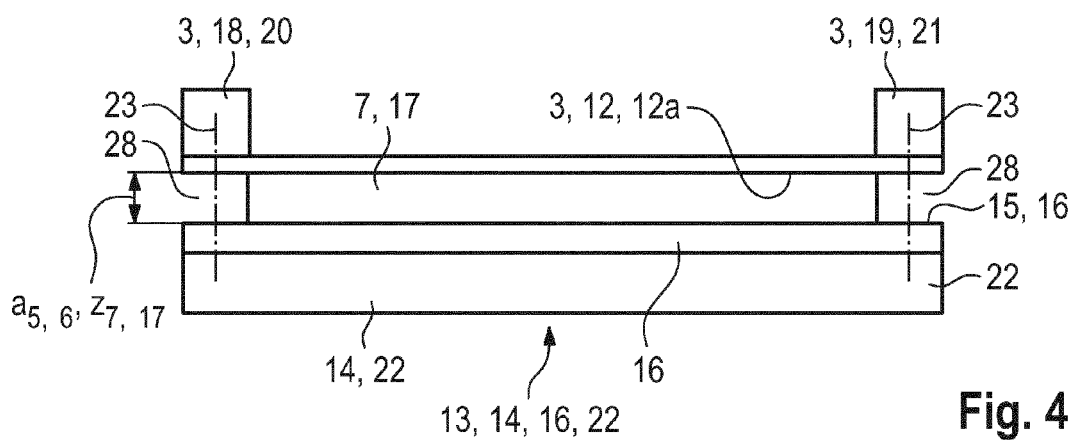
FIG. 4 is a cross-sectional view of the floor which is shown in FIG. 1, of a damping component which is shown in FIG. 3 and is situated in a compressed state on the underside of the floor, and of a housing structure which is arranged below the damping component and is fastened to longitudinal carriers of the floor.

FIG. 4 shows a floor or a floor structure 3 of a motor vehicle 1. The motor vehicle 1 has a vehicle body 2 with a passenger compartment (not shown). On opposite sides, the passenger compartment is delimited by way of side frames which, at the respective lower end thereof, in each case have a side sill with an integrated or separate longitudinal carrier.

A housing structure 13 for an energy store 14 is fastened to an outer face 12a of an underside 12 of the floor structure 3. The housing structure 13 is a closed container comprising a tub-shaped component 22 and a cover 16. The tub-shaped component 22 has circumferential side walls and a floor which is arranged on the side walls.

The cover 16 is spaced apart from the floor 22a of the tub-shaped component 22 with the formation of a cavity. Energy stores 14 in the form of batteries and optionally in the form of a fuel tank are arranged in the cavity of the housing structure 13.

A damping component 7 is arranged in an intermediate space 28 between the underside 12 of the floor 3 of the vehicle body 2 of the motor vehicle 1 and an outer face 15 of the cover 16 of the housing structure 13.

The assembly of the damping component 7 and the housing structure 13 takes place in one embodiment in such a way that first of all the damping component 7 is arranged on the floor 3 and subsequently the housing structure 13 is positioned on the damping component 7. In another embodiment, the damping component 7 is first of all arranged on the housing structure 13, and the housing structure 13 is subsequently positioned with the damping component 7 on the floor 3.

Afterward, the fastening of the housing structure 13 takes place, for example via a screw connection 23, in each case to a lateral longitudinal carrier or a side sill 18, 19 which is configured in each case on the respective outer edge 20, 21 of the floor 3.

During the fastening of the housing structure 13 to the floor 3, the damping component 7 is compressed by an amount z which lies at $Z_{5,6}$ in the embodiment which is shown, that is to say the maximum vibration amplitude $a_{5,6}$ from FIG. 2. The damping component 7 has a height $z_{7,17}$ in the prestressed state 17 from FIG. 4.

The damping component 7 is compressed to a greater extent in the middle region than at the edge regions. In the case of an upward vibration of the floor 3, the compressed region of the damping component 7 follows the opposite region of the floor 3, with the result that the floor 3 is braked by way of the damping component 7 during swinging back of the floor 3.

A compensation of the tolerances which are present on account of assembly and production processes also takes place by way of the prestress of the damping component 7, 24a to 24d, 26.

The extent of the prestress of the damping component 7 is dependent on a plurality of parameters. An assembly play of $s_{13}$ is required in order to carry out the assembly of the housing structure 13 and the damping component 7 on the floor 3 and the fastening 23 of the housing structure 13 to the floor 13. By way of example, the assembly play lies at 2 mm$\leq s_{13} \leq$6 mm.

In addition, there is a component tolerance $t_{3,13}$ of the floor 3 and/or the housing structure 13, which component tolerance lies, for example, at 3 mm$\leq t_{3,13} \leq$3 mm.

A possible maximum vibration amplitude a of the floor 3 lies, for example, at −1 mm$\leq a_3 \leq$1 mm. The minimum and the maximum extension of the prestressed damping component 7 results from the consideration of the assembly play $s_{13}$, the production tolerance $t_{3,13}$ and the maximum vibration amplitude $a_{max}$.

The force flow between the outer face 15 of the housing structure 13 and the outer face 12a on the underside 12 of the floor 3 and the prestressed damping component 7 which is arranged inbetween is therefore secured in any tolerance situation via the material property and geometric design.

In one embodiment, the damping component 7 consists of a large-pored foam, in particular an elastomer foam. The material of the damping component 7 has high damping properties, can be adapted geometrically to the shape to be damped of the floor 3 and the housing structure 13 of the energy store 14, and can be prestressed or compressed by up to 70%.

The bracing of the damping component takes place by way of the fastening 23 of the housing structure 13, for example via a screw connection, to the respective side sills or longitudinal carriers 18 or 19.

In one embodiment, the damping component 7 is adhesively bonded on the outer face 12a of the underside 12 of the floor 3 and/or on the outer face 15 of the upper side 16 of the housing structure 16.

Figure 5:
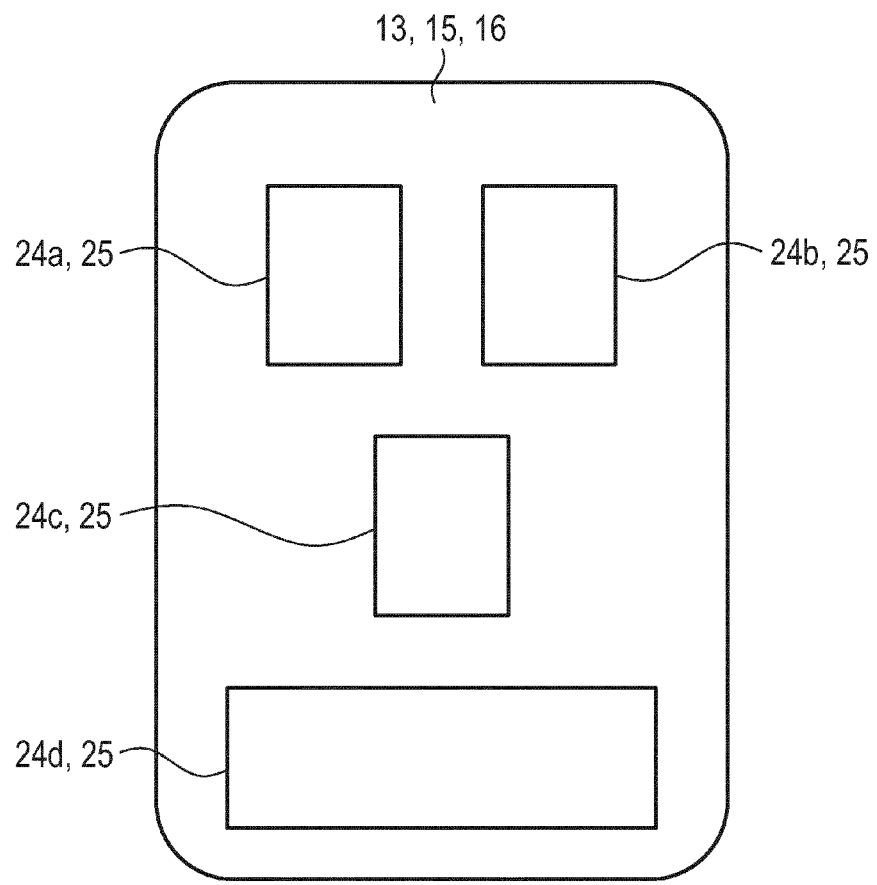
FIG. 5 is a plan view of an upper side of the housing structure, on which large-area damping components are arranged at vibration-relevant locations.
Figure 6:
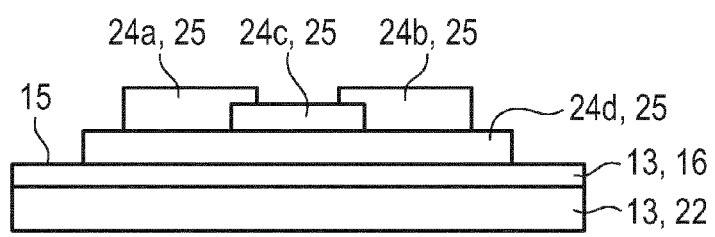
FIG. 6 is a cross-sectional view from the front of the housing structure which is shown in FIG. 5 with the damping components which are arranged on it.

FIGS. 5 and 6 show one embodiment, in which individual damping components 24a, 24b, 24c and 24d are arranged partially on the upper side 16 of the housing structure 13 at locations, at which the floor 3 has a higher vibration amplitude a.

In the view from the front in FIG. 6, the damping opponents 24a to 24d are situated in the relieved state 25. A different vibration damping action is possible by way of the different heights of the damping components 24a to 24d which are shown in FIG. 6.

Figure 7:
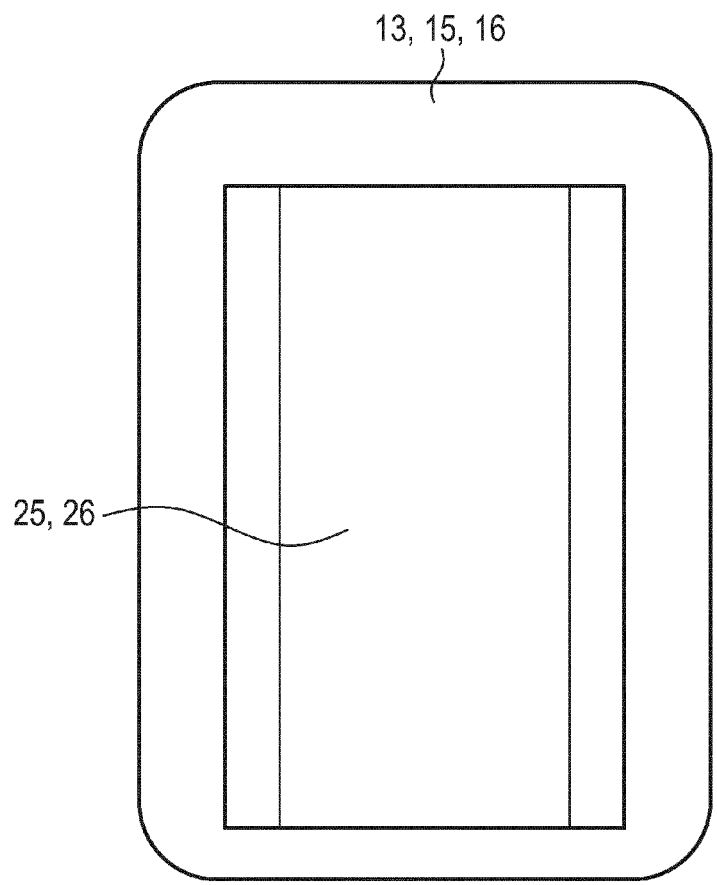
FIG. 7 is a view from above of the upper side of the housing structure, on which a single large-area damping component with a cross section in accordance with FIG. 3 is arranged.
Figure 8:
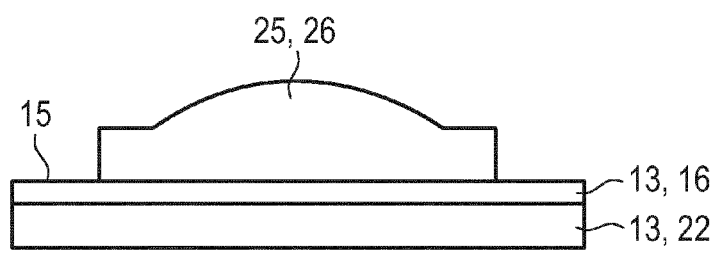
FIG. 8 is a cross-sectional view of the embodiment which is shown in FIG. 7 and in which the damping component has a cross section which is composed of a rectangular cross section and of a circular segment-shaped cross section.

FIGS. 7 and 8 show a second embodiment, in which a large-area damping component 26 is arranged on the upper side 16 of the housing structure 13. The damping component 26 is situated in the relieved state 25 in FIGS. 7 and 8.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle having a vehicle body with a passenger compartment having a floor structure, comprising:
   a housing structure for energy stores fastened to an underside of the floor structure, wherein
   the housing structure is a closed container with a tub-shaped component and a cover for the tub-shaped component;
   at least one damping component arranged in an intermediate space between the underside of the floor structure and an outer face of the cover of the housing structure, wherein
   the at least one damping component is installed under prestress in the intermediate space, and
   the at least one damping component is a compressible foam, and the compressible foam of the damping component is compressed by way of a fastening of the housing structure to the floor structure to a height which is dependent on a vibration amplitude which occurs at an attachment location of the damping component below the floor structure during a journey of the motor vehicle and the associated excitation of the floor structure.

2. The motor vehicle as claimed in claim 1, wherein the compressible foam of the damping component is an elastomer foam.

3. The motor vehicle as claimed in claim 1, wherein the damping component is adhesively bonded on the outer face of the cover of the housing structure of the energy store.

4. The motor vehicle as claimed in claim 3, wherein the damping component is further adhesively bonded on the underside of the floor structure.

5. The motor vehicle as claimed in claim 1, wherein the damping component is adhesively bonded on the underside of the floor structure.

6. The motor vehicle as claimed in claim 1, wherein the compressible foam has a rigidity which is adapted to a loading situation.

7. The motor vehicle as claimed in claim 1, wherein the damping component covers at least from 10 to 90% of the outer face on the underside of the floor structure.

8. A motor vehicle having a vehicle body with a passenger compartment having a floor structure, comprising:
a housing structure for energy stores fastened to an underside of the floor structure, wherein
the housing structure is a closed container with a tub-shaped component and a cover for the tub-shaped component;
at least one damping component arranged in an intermediate space between the underside of the floor structure and an outer face of the cover of the housing structure, wherein
the at least one damping component is installed under prestress in the intermediate space, and
the at least one damping component is a compressible foam, and
the damping component is adhesively bonded on the outer face of the cover of the housing structure of the energy store.

9. A motor vehicle having a vehicle body with a passenger compartment having a floor structure, comprising:
a housing structure for energy stores fastened to an underside of the floor structure, wherein
the housing structure is a closed container with a tub-shaped component and a cover for the tub-shaped component;
at least one damping component arranged in an intermediate space between the underside of the floor structure and an outer face of the cover of the housing structure, wherein
the at least one damping component is installed under prestress in the intermediate space, and
the at least one damping component is a compressible foam, and
the damping component is adhesively bonded on the underside of the floor structure.

10. A motor vehicle having a vehicle body with a passenger compartment having a floor structure, comprising:
a housing structure for energy stores fastened to an underside of the floor structure, wherein
the housing structure is a closed container with a tub-shaped component and a cover for the tub-shaped component;
at least one damping component arranged in an intermediate space between the underside of the floor structure and an outer face of the cover of the housing structure, wherein
the at least one damping component is installed under prestress in the intermediate space, and
the at least one damping component is a compressible foam,
the damping component covers at least from 10 to 90% of the outer face on the underside of the floor structure.

11. A motor vehicle having a vehicle body with a passenger compartment having a floor structure, comprising:
a housing structure for energy stores fastened to an underside of the floor structure, wherein
the housing structure is a closed container with a tub-shaped component and a cover for the tub-shaped component;
a plurality of individual damping components comprised of a compressible foam, wherein
the individual damping components are installed under prestress in the intermediate space between the underside of the floor structure and an outer face of the cover of the housing structure at locations where the floor structure has higher vibration amplitudes.

12. The motor vehicle according to claim 11, wherein at least one of the plurality of individual damping components has a different height.

* * * * *